UNITED STATES PATENT OFFICE.

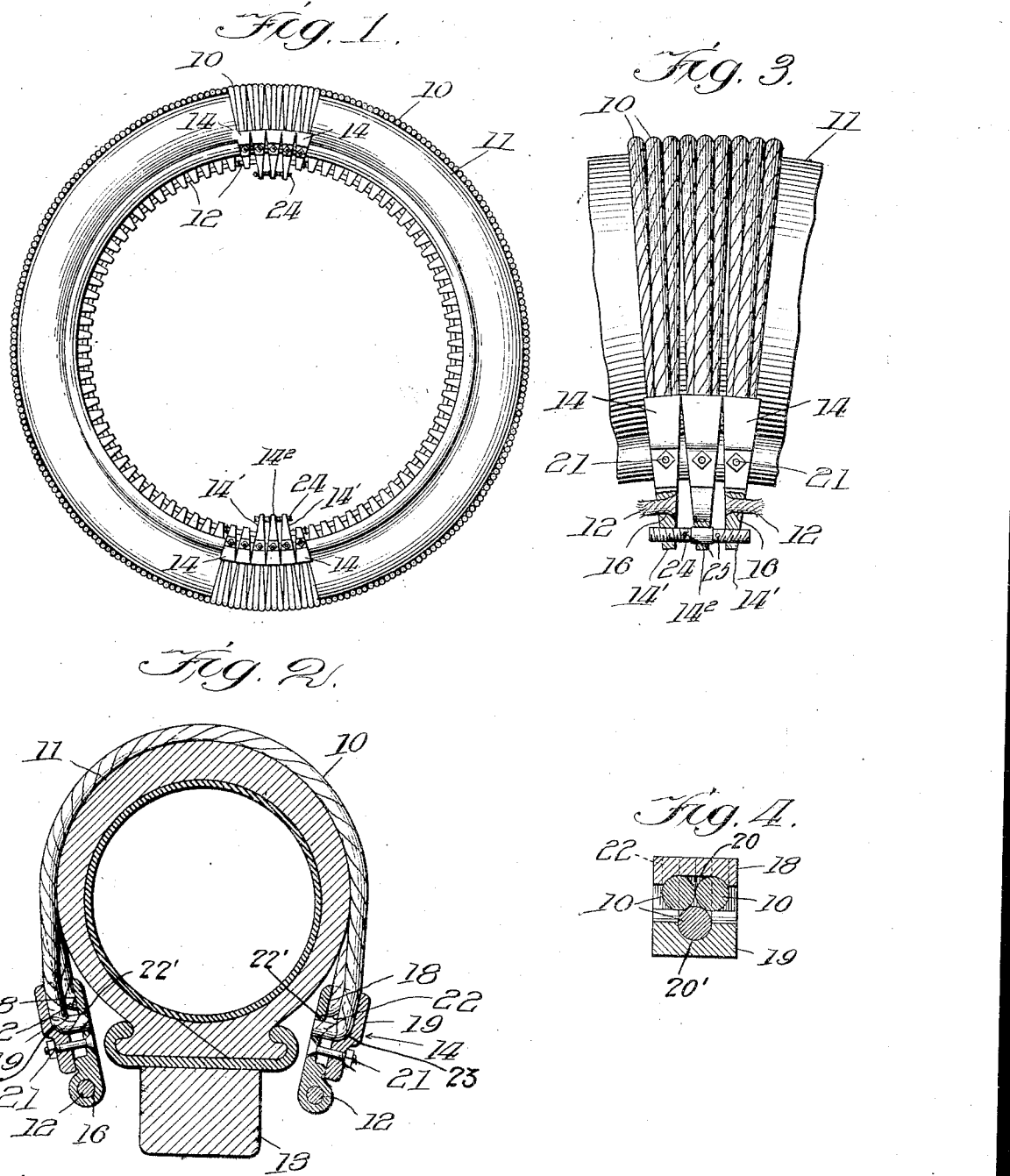

CHARLES E. HUXLEY, OF CHICAGO, ILLINOIS.

ARMOR FOR PNEUMATIC TIRES.

964,783.  Specification of Letters Patent.  Patented July 19, 1910.

Application filed July 23, 1909. Serial No. 509,080.

*To all whom it may concern:*

Be it known that I, CHARLES E. HUXLEY, a citizen of the United States, and a resident of Chicago, in the county of Cook and State of Illinois, have invented certain new and useful Improvements in Armors for Pneumatic Tires; and I do hereby declare that the following is a full, clear, and exact description thereof, reference being had to the accompanying drawings, and to the numerals of reference marked thereon, which form a part of this specification.

This invention relates to improvements in armors for cushioned tires, and more particularly for pneumatic tires, and the invention consists in the matters hereinafter set forth and more particularly pointed out in the appended claims.

Among the objects of the invention is to provide a protecting armor or shield for such tires which will protect the tire from punctures and "blow outs" or explosions, and which will brace the tire from lateral deflection on the rim against side stresses thrown thereon.

A further object of the invention is to provide an armor for these purposes which is so constructed that worn or broken parts may be easily replaced.

A still further object of the invention is to provide an improved tire armor which is held fixedly in place and which will serve as a means to increase the tractive force of the tire.

In the drawings, Figure 1 is a side elevation of a tire and my improved armor, showing the manner of applying the armor thereto, the armor being partly broken away. Fig. 2 is a cross section thereof. Fig. 3 is an enlarged fragmentary side elevation of the tire and armor, showing more clearly the construction of the latter. Fig. 4 is a sectional view of one of the clamping devices by which the tread strands are held in place on the tire tread.

My improved armor embraces a series of strands 10, arranged transversely across the tread of the tire 11, circular, flexible attaching members 12, 12 at the sides of the wheel 13 and a plurality of links or fittings 14 by which the tread strands are flexibly connected with the circular attaching members 12, said strands being brought down along the side of the tire for connection with said links. The tread strands, which may be made of cable or wire (preferably the former) lie side by side closely together on the tire tread so as to cover the tread and protect the same from puncture. The said tread strands may be made of short lengths to extend across the tread for connection with the fittings 14. As herein shown the tread strands are attached by clamping means to said connecting fittings or links 14. This arrangement is recommended, inasmuch as it facilitates and cheapens the replacement of broken or worn strands.

The connecting links or fittings 14 by which the tread strands are flexibly connected with the circular, flexible side attaching members may be made of any suitable or preferred form. As herein shown, they are arranged in lateral pairs, the links or fittings of each pair being arranged one at one side and the other at the other side of the tire. Each pair of links are adapted for attachment to three adjacent strands arranged side by side, the ends of said strands being clamped or otherwise attached to the links. Said links are provided at their inner ends with apertures 16 through which are threaded the flexible side attaching members, which latter are preferably made of cable or flexible wire of proper size. The said links or fittings herein shown each consists of two members 18, 19, the former being elongated and provided with the aperture 16, and the latter being made shorter and adapted to be bolted or otherwise clamped to the member 18. Between said two members, at the outer ends of the fittings or links, are clamped the ends of the tread strands, as the fittings herein shown are designed.

As before stated, each pair of links or fittings 14 are designed to hold in place three adjacent tread strands. The adjacent ends of two of said strands lie side by side in said link or fitting between the clamping members 18, 19 thereof, one member of which is hollowed out to provide a recess 20 to receive them, and the end of the third strand lies over and between the ends of said two strands, as most clearly shown in Fig. 4 and occupies a recess 20′ in the other clamping member of the fitting. The overlapping arrangement of the ends of the tread strands, which lie side by side on the tread of the tire, is made necessary owing to the general radial arrangement of said strands. Any suitable means may be applied to clamp the members of the fittings or links together to attach the tread strand ends thereto. As herein shown bolts 21 are provided which extend through the fitting members and are provided at their outer ends with clamping nuts. As herein shown the ends of the tread strands are turned inwardly at a right angle, as shown at 22, to enter openings 22' formed on the inner clamping members 18 and the outer clamping members 19 are formed with clamping surfaces 23 which closely fit the strands at their out-turned ends. This arrangement greatly increases the holding effect of the fittings on the strands. In order that the fittings or links may move more freely inwardly relatively to each other upon compression of the tire, the inner ends thereof are tapered, as most clearly shown in Fig. 3, giving said fittings a generally tapered form in side elevation.

The flexible, side attaching members 12 are provided with means for adjusting them in a manner to draw the tread strands tightly over the tire when the latter is inflated. Such adjusting means may be made of various forms, in the nature of a turn buckle or right and left hand screw. As herein shown the latter form of device is employed. The adjusting device shown embraces a screw stud 24 provided at its ends with right and left hand screw threads which coöperate with two specially formed adjacent link or fitting ends 14'. As shown said screw stud extends loosely through an aperture in an extended end 14² of a link intermediate the link ends 14'. The inwardly extended ends of the links or fittings 14' are provided with screw-threaded openings which receive the ends of the right and left hand screw-threaded stud whereby said fittings may be drawn together or allowed to spread apart. The ends of the strands or wires constituting the side attaching members are attached in any suitable manner to the link or fitting ends 14', as for instance in the manner shown in Fig. 3. The adjusting screws may be provided between their ends with openings 25 by which they are conveniently engaged by an implement to rotate the same when adjusting the attaching members. One or more of such adjusting devices for the flexible side attaching members may be employed, as found most convenient or desirable.

My armor described is flexible to adjust itself to or follow the flexing movement of the tire tread in operation and is of such nature that the parts thereof move freely upon themselves during flexing action, and resume their normal side by side positions on the tread of the tire when the latter is distended. Moreover the construction and arrangement of the armor and its attaching means are such that the tread strands are held firmly on the tire tread, and also serve to support the tire against "blow outs" or explosions and to hold the tire in place on the rim against side stresses tending to flex the tire laterally on its seat. The tread strands may be readily replaced when broken or worn at small cost of time and labor, as well as material. The armor while serving as a means for avoiding puncture and explosion of the tire, also greatly increases the tractive force thereof.

An advantage of the use of cylindric strands, such as wire or cable, connected to the side attaching members in the general manner shown, is, first, there are no sharp projections on the armor which tend to wear the tire, the members of the armor or the roadway, and, second, there are no joints which wear in the flexing movement of the armor members, or tend to permit the tread members or strands to stretch or become elongated. The feature of non-extensibility is of great importance.

Another feature of advantage is the use of simple tread members, which constitute the direct tread of the armor, as distinguished from compound members, or those made up of a number of connected parts, the construction possessing great simplicity, being readily applied and economical to construct. An advantage of the use of twisted metal cables is that the wearing or fraying of the twisted strands of the cable slightly roughen the surface of the armor without substantially weakening the same, and presents an improved gripping or holding surface to the roadway without road or tire cutting projections.

A further feature of advantage of the armor or shield is that it protects the sides of the tire, as well as the tread thereof, and this feature is especially useful when driving over rough and broken roadways.

It is to be understood that the structural details of the invention may be widely varied from the illustrated embodiment herein shown, and that the invention is not limited to such details except as hereinafter made the subject of specific claims.

I claim as my invention:

1. A tire armor comprising round, flexible strands or cables arranged to extend transversely across the tread of the tire and being in contact with each other at the tire tread and laterally overlapping each other at their ends at the sides of the tire, and fastening means engaging the ends of said strands or cables for fastening them upon the tire.

2. A tire armor comprising round cables made of twisted strands and arranged to extend transversely across the tread of the tire and being in contact with each other at the tire tread and fastening means for fixing said strands on the tire.

3. A tire armor comprising round cables made of twisted strands and arranged to extend transversely across the tread of the tire and being in contact with each other at the tire tread, and circular, flexible, unattached fastening members at the sides of the tire to which the ends of said cables are connected.

4. A tire armor comprising round strands or cables arranged to extend across the tire tread with their ends extending down along the side of the tire, said strands being in contact with each other at the tire tread and laterally overlapping at their ends, clamping devices releasably engaging the ends of said strands in their overlapped portions and circular, flexible, unattached side members engaging said clamping devices.

5. A tire armor comprising round cables made of twisted strands and arranged to extend transversely across the tread of the tire and being in contact with each other at the tire tread and laterally overlapping at their ends at the sides of the tire, circular, flexible unattached side members and fastening means for connecting the side members with the ends of said cable comprising a plurality of pairs of clamping members between which the ends of said cables are confined, means for clamping said members upon the cable ends, and means for loosely connecting said clamping members with said side members.

6. A tire armor comprising round, flexible strands or cables arranged to extend transversely across the tread of the tire and being in contact with each other at the tire tread and laterally overlapping each other at their ends at the sides of the tire and means for fastening the armor to the tire embracing a plurality of pairs of clamping members, each pair arranged to receive and hold between them a plurality of pairs of strands and having means for pressing them upon the strand ends and circular attaching members at the sides of the tire to which said clamping members are loosely attached.

7. A tire armor comprising round cables made of twisted strands and arranged to extend transversely across the tread of the tire and being in contact with each other at the tire tread and laterally overlapping at their ends at the sides of the tire, circular, flexible, unattached side members and fastening means for connecting the side members with the ends of said cables comprising a plurality of pairs of clamping members between which the ends of said cables are confined, means for clamping said members upon the cable ends, and means for loosely connecting said clamping members with said side members, one of the clamping members of each pair being provided with lateral openings and the cable ends being laterally turned to enter said openings.

In testimony, that I claim the foregoing as my invention I affix my signature in the presence of two witnesses, this 20th day of July A. D. 1909.

CHARLES E. HUXLEY.

Witnesses:
W. L. HALL,
WILLIAM GOLDBERGER.